Oct. 18, 1960

L. ALSTON 2,956,762

COMBINATION LAWN HOSE AND WATER NOZZLE SUPPORT

Filed Feb. 12, 1960

INVENTOR.
LEROY ALSTON,
BY
McMorrow, Berman & Davidson
ATTORNEYS.

2,956,762

COMBINATION LAWN HOSE AND WATER NOZZLE SUPPORT

Leroy Alston, 2253 Pleasant Ave., Hamilton, Ohio

Filed Feb. 12, 1960, Ser. No. 8,333

7 Claims. (Cl. 248—87)

This invention relates to the general field of supports and, more specifically, the instant invention pertains to the provision of a combination lawn hose and water nozzle support.

One of the primary objects of this invention is to provide, in combination, a lawn hose support especially adaptable for storing a hose indoors or outdoors, and which is also adaptable to hold a lawn hose nozzle for spraying water during the irrigation of shrubs, trees, lawns, et cetera.

Another object of this invention is to provide a support for a lawn hose including a handle whereby the support may be carried with ease from one site to another or which may be utilized in conjunction with other means for temporarily supporting the lawn hose support device in an elevated position during temporary storage.

A further object of this invention is to provide a lawn hose support rack to hold a number of convolutions of the hose as coiled and whether or not the support is used to hold a hose nozzle in a selected direction for spraying.

Still another object of this invention is to provide a lawn hose support of the type generally referred to supra, the support being of light weight elements and capable of being knocked down for shipping purposes.

This invention contemplates, as a still further object thereof, the provision of a combination lawn hose and water nozzle support which is non-complex in construction and assembly, inexpensive to manufacture and maintain, and which is durable in use.

Figure 1:
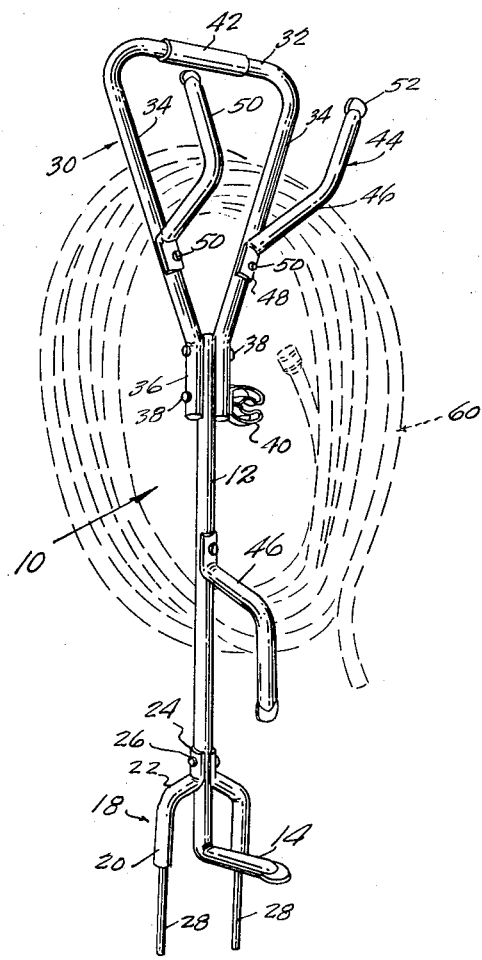
Figure 2:
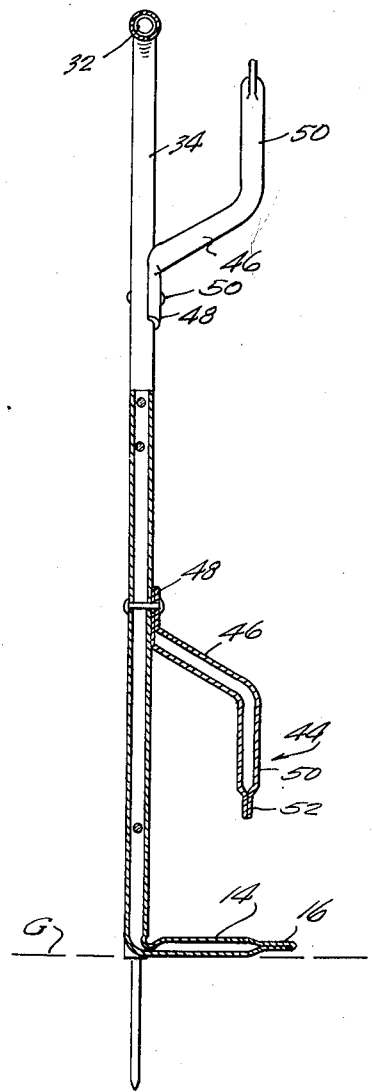

Other and further objects and advantages of the instant invention will become more manifest from a consideration of the following specification when read in conjunction with the annexed drawing, in which:

Figure 1 is a perspective view of a combined lawn hose and water nozzle support constructed in accordance with this invention; and, Figure 2 is a vertical medial cross-sectional view, partly in elevation, of the support illustrated in Figure 1.

Referring now more specifically to the drawing, reference numeral 10 designates, in general, a combination lawn hose and water nozzle support constructed in accordance with the teachings of this invention. The support 10 is seen to include an elongated substantially hollow tubular cylindrical main support member 12 which terminates at one of its ends in a laterally offset hollow tubular cylindrical ground-engaging foot 14, the latter, at its outer end being crimped together as indicated at 16 (see Figure 2).

As is seen in the drawings, a pair of hollow tubular substantially cylindrical brackets 18 project laterally from diametrically opposed sides of the support member 12 adjacent the ground engaging foot 14, each of the brackets comprising a main body portion 20 having a laterally offset leg 22 upwardly at an obtuse angle towards the support member 12. The upper end of each of the brackets 18 terminates in a flat offset foot 24 having a concave-convex configuration of which the concave side thereof engages against the support member 12. The brackets 18 may be fixedly secured to the support member 12 by any conventional means such as, for example, a rivet 26. The lower ends of the main body portions 20 preferably terminate in a common plane and the plane is also tangent to the underside of the foot 14. These lower ends of the main body portions 20 also serve as means for limiting the degree to which the ground-engaging tines 28 which depend therefrom may be inserted in the ground.

Fixedly secured to the other or upper end of the main support member 12 is a hollow tubular handle denoted at 30. Handle 30 has a substantially cylindrical configuration in transverse cross-section and, as is seen in Figure 1, the handle 30 has an inverted substantially triangular configuration, in general, and including an elongated base 32 from the opposed ends of which project arms 34 converging towards each other and which, adjacent the apex ends thereof, terminate in offset substantially parallel arm extensions 36 that extend along diametrically opposed sides of the main support member 12 at the upper end thereof. The arm extensions 36 are secured to the main support member 12 by conventional means such as rivets 38. The lowermost one of the rivets 38 also pivotally connects a conventional spring clamp 40 to the main support member 12. If desired, the base 32 may have telescoped thereon and fixedly secured thereto intermediate its ends, a hand gripping sleeve 42.

Reference numeral 44 denotes one of three identically shaped and constructed lawn hose hanger brackets. Each of the brackets 44 is formed of a hollow tubular cylindrical material and comprises a base section 46 from one end of which projects at an obtuse angle a flat concave-convex leg 48, the concave sides of two of such legs being engaged against the arms 34 adjacent the apex ends thereof and are fixedly secured thereto by means of rivets 50 or other means of a conventional type. The third hanger bracket 44 has its respective leg 48 fixedly secured to the main support member 12.

The other ends of the base sections 46 terminate in angularly offset hose displacement guards 50 having flattened outer ends 52. The longitudinal axes of the guards 44 connected to the arms 34 are parallel, respectively, to the longitudinal axes of the latter and these guards 50 extend parallel to the arms 34 in laterally spaced relation relative thereto and extend therefrom in the same direction as the ground engaging foot 14. The longitudinal axis of the third bracket 44 is parallel to the longitudinal axis of the support member 12 and the guard of the third bracket extends parallel to the support member 12 in laterally spaced relation.

As is seen in the figures, the first two mentioned brackets 44 extend upwardly while the third of the brackets 44 projects downwardly.

A hose indicated in broken lines in Figure 1 of the drawings and designated by the reference numeral 60 may be wound around the base sections 46 and, with respect to the upper two brackets 44, displacement therefrom is prevented by the arms 34 and the guards 44. Similarly, the hose 60 is prevented from displacement from the base 46 at the lower end of the combined support 10 by means of the support member 12 and the depending guard 50.

With the convolutions of the hose 60 wound on the base sections 46 of the guards 44, the user may move the combined lawn hose and water nozzle support from one site to another by merely grasping the handle sleeve 42 and manually carrying the same. When the desired location is reached, the tines 28 are inserted into the ground G until the lower ends of the brackets 18 engage thereagainst (see Figure 2). In this position, the foot 14 will also engage the ground G. If desired, the foot 14 may be engaged by foot of the user to force the tines 28 downwardly into the ground. The foot 14 also serves the further purpose of preventing the combined hose and nozzle support 10 from tipping over due to the weight of the hose 60 on one side of the support 10.

The clamp 40 is designed to receive the nozzle of the hose 60 releasably therein to relieve the user under such conditions that require irrigation continuously in a given location, and from the foregoing description it will be obvious to those skilled in this art that all or a part of the convolutions of the hose 60 may be removed from the support 10 while this operation is being carried out.

While the above specification described the securing means as comprising rivets, it should be obvious that bolts and nuts, including wing nuts, could be substituted therefor, thereby permitting the support 10 to be knocked down for shipping purposes and easily assembly by the user.

The combined hose and nozzle support 10 may be easily stored or supported from a wall or other similar structure by means of a peg projecting laterally therefrom over which the handle 32 is passed.

Having described and illustrated one embodiment of this invention in detail, it will be understood that the same is offered merely by way of example and that this invention is to be limited only by the scope of the appended claims.

What is claimed is:

1. A hose support comprising an elongated support member having a pair of opposed ends, one of said ends terminating in a pair of diverging arms, a hose support base member projecting laterally from each of said arms, each of said base members terminating at the outer end thereof in an angular offset guard member extending in a direction away from said support member, and ground engaging means fixedly secured to the other end of said support member.

2. A hose support comprising an elongated support member having a pair of opposed ends, one of said ends terminating in a pair of diverging arms, a hose support base member projecting laterally from each of said arms, each of said base members terminating at the outer end thereof in an angular offset guard member extending in a direction away from said support member, a third hose support base member projecting laterally away from said support member, said third base member terminating at its outer end in an angularly offset guard member extending in a direction toward the other end of said support member, and ground engaging means fixedly secured to the other end of said support member.

3. A hose support comprising an elongated support member having a pair of opposed ends, one of said ends terminating in a pair of diverging arms, a hose support base member projecting laterally from each of said arms, each of said base members terminating at the outer end thereof in an angular offset guard member extending in a direction away from said support member, each of said guard members having their longitudinal axes parallel to the longitudinal axes of their respective associated arms, a third hose support base member projecting laterally away from said support member, said third base member terminating at its outer end in an angularly offset guard member extending in a direction toward the other end of said support member, the longitudinal axis of said third guard member being parallel to the longitudinal axis of said support member, and ground engaging means fixedly secured to the outer end of said support member.

4. A hose support comprising an elongated cylindrical support member having a pair of opposed ends, ground engaging means fixedly secured to one end of said support member, a pair of cylindrical arms having one of their respective ends connected to the other end of said support member on diametrically opposed sides thereof, said arms diverging away from said support member, a cylindrical hose supporting base member for each of said arms, said base member projecting laterally from its associated arm and having an end fixedly connected thereto, and each of said base members having their respective ends bent to project in a direction away from said support member and in spaced relation relative to their respective associated arms.

5. A hose support comprising an inverted substantially hollow triangular frame having a base from the ends of which project a pair of converging arms, said arms adjacent the apex of said frame being rigidly connected to diametrically opposed sides of an elongated substantially hollow tubular cylindrical main support member, ground engaging means fixedly secured to the other end of said main support member on diametrically opposed sides thereof and depending therefrom, an elongated hollow cylindrical hose supporting base projecting laterally from each of said arms, and the outer end of each of said bases being bent to form guards extending away from said main support member parallel to their respective associated arms in laterally spaced relation relative thereto.

6. A hose support comprising an inverted substantially hollow tubular triangular frame having a base from the ends of which project a pair of converging arms, said arms adjacent the apex of said frame being rigidly connected to diametrically opposed sides of an elongated substantially hollow tubular cylindrical main support member, ground engaging means fixedly secured to the other end of said main support member on diametrically opposed sides thereof and depending therefrom, an elongated hollow cylindrical hose supporting base projecting laterally from each of said arms, the outer end of each of said bases being bent to form guards extending in a direction away from said main support member and parallel to their respective associated arms in laterally spaced relation relative thereto, and a third hose supporting base projecting laterally from said main support member and terminating at its outer end in a guard bent substantially parallel to said main support member and extending in laterally spaced relation relative thereto in a direction towards said other end of said main support member.

7. A hose support comprising an inverted substantially hollow triangular frame having a base from the ends of which project a pair of converging arms, said arms adjacent the apex of said frame being rigidly connected to diametrically opposed sides of an elongated substantially hollow tubular cylindrical main support member, ground engaging means fixedly secured to the other end of said main support member on diametrically opposed sides thereof and depending therefrom, an elongated hollow cylindrical hose supporting base projecting laterally from each of said arms, the outer end of each of said bases being bent to form guards extending in a direction away from said main support member and parallel to their respective associated arms in laterally spaced relation relative thereto, a third hose supporting base projecting laterally from said main support member and terminating at its outer end in a guard bent substantially parallel to said main support member and extending in laterally spaced relation relative thereto, and said main support member terminating at its said other end in a hollow tubular cylindrical offset ground engaging foot disposed intermediate said ground engaging means.

References Cited in the file of this patent

UNITED STATES PATENTS

| | | |
|---|---|---|
| 2,747,823 | Swenholt | May 29, 1956 |
| 2,757,958 | Bussey | Aug. 7, 1956 |
| 2,894,706 | Cappio | July 14, 1959 |